Patented Oct. 16, 1951

2,571,911

UNITED STATES PATENT OFFICE 2,571,911

PREPARATION OF GUANIDINE SALTS

Nat H. Marsh, Noroton Heights, Conn., assignor to American Cyanamid Company, New York, N. Y., a corporation of Maine No Drawing. Application November 19, 1949, Serial No. 128,501

4 Claims. (Cl. 260—564)

This invention relates to the preparation of guanidine salts by reacting ammonia and carbon monoxide.

It has been found that ammonia and carbon monoxide can be passed over activated carbon at a temperature within the range 210–450° C. and under a pressure of at least 100 p. s. i. to form guanidine values. By guanidine values is meant guanidine in combined form, such as guanidine cyanate, cyanurate, carbamate, the ammelide salt of guanidine, and the ammeline salt of guanidine, and the like. One or more of these guanidine salts is formed in the process of the present invention.

The preferred temperature range is 250–350° C. The preferred range is 2000–5000 p. s. i. However, pressures as high as 20,000 p. s. i., and even higher, can be used.

The reactants can be present in any proportion, but it is preferred that the ammonia be present in a molar excess.

It is to be understood that ammonia and carbon monoxide may be supplied to the reaction zone, as such, or as a material such as formamide, or the like, that decomposes under the reaction conditions to yield ammonia and carbon monoxide. Similarly, carbon monoxide may be formed in the reaction zone through the incomplete oxidation of carbonaceous materials in the presence of oxygen or oxygen-containing substances. Therefore, when ammonia and carbon monoxide are mentioned in the following description and claims, substances which yield them are to be considered equivalents thereof.

The following specific examples illustrate, without limiting, the invention.

EXAMPLE 1

There was placed in a 300 ml. autoclave 15 g. of an activated charcoal catalyst. The autoclave was closed and 50 g. of anhydrous ammonia introduced into it from a transfer bomb. Carbon monoxide was then pumped into the autoclave until the autoclave pressure gauge read 1000 p. s. i. The weight of carbon monoxide introduced was about 10 g. The autoclave was then heated at 300° C. for 20 hours. When this temperature was first reached, the observed autoclave pressure was about 4800 p. s. i. (gauge). At the end of the heating period, the autoclave was cooled to room temperature, vented to remove excess ammonia, unreacted carbon monoxide, and any other gases generated during the course of the reaction. The autoclave was then opened and its solid contents scraped into a beaker. The reaction mass contained guanidine values in the form of one or more salts, such as the cyanate, cyanurate, carbamate, ammelide, and ammeline salts of guanidine, together with some melamine.

The reaction mass was leached with boiling water, in which melamine, as well as the guanidine salts, was soluble, and then melamine was allowed to precipitate by cooling the aqueous extract to room temperature. Melamine was filtered and the filtrate worked up to recover guanidine values, as follows.

The guanidine salts may be worked up from the aqueous extract by fractional crystallization, but it is preferred to recover all of the guanidine values at once in one form, such as by the addition of a soluble nitrate to precipitate the sparingly soluble guanidine nitrate.

In the preceding example, the guanidine values produced were stabilized by various acids, simultaneously produced in the process, such as cyanic acid, cyanuric acid, ammeline, ammelide, carbamic acid, and the like. In one modification of the invention, the acid-stabilizing component is added as an initial reagent, and this serves to stabilize any guanidine values formed without an excessive conversion of ammonia and carbon monoxide to acidic components. In accordance with this modification, such acids as hydrochloric, sulfuric, and the like, may be introduced into the reaction zone, preferably in the form of their ammonium salts. The following example illustrates such a modification, using hydrochloric acid in the form of its ammonium salt, ammonium chloride.

EXAMPLE 2

Into a 300 cc. rocker type autoclave is placed 15 g. of activated charcoal. There is then added 17.8 g. of ammonium chloride and the autoclave is closed. Next, 34 g. of ammonia is introduced into the autoclave from a transfer bomb. Following this operation, 9.3 g. of relatively pure carbon monoxide is added from a transfer bomb. The autoclave is sealed and heated for 20 hours at 230° C. At the end of this period, the vessel is cooled, the pressure released and guanidine hydrochloride extracted by the following procedure. The solid is extracted with alcohol to remove alcohol-soluble materials. The residue is extracted with cold water and filtered. The filtrate contains guanidine hydrochloride which may be precipitated by the addition of ammonium nitrate as the relatively insoluble guanidine nitrate.

The catalyst

The catalyst is critical. So far as is known, the activated carbons, including the activated charcoals, are the only catalysts that will give guanidine. It has been found that if the catalyst does not contain activated carbon, no guanidine is obtained.

Before use, the catalyst should be thoroughly dried, as for example, by passing a hot inert gas over it for a few hours. In the above examples, hydrogen at 300° C. was used. If desired, one or both of the reactant gases (ammonia and/or carbon monoxide) may be used.

While the invention has been described with particular reference to specific embodiments, it is to be understood that it is not to be limited thereto, but is to be construed broadly and restricted solely by the scope of the appended claims.

I claim:

1. The method of preparing a guanidine salt which comprises reacting ammonia and carbon monoxide and a member of the group consisting of ammonium chloride, ammonium sulfate, hydrogen chloride, and sulfuric acid at a temperature within the range of 210–450° C., under a pressure of at least 100 p. s. i., in the presence of an activated carbon catalyst which has been pre-dried to render it anhydrous and recovering the thus formed guanidine salt.

2. The method of claim 1 in which the mol ratio of ammonia to carbon monoxide is greater than one.

3. The method according to claim 1 in which the temperature is within the range of 250–350° C. and the pressure is within the range 2000–5000 p. s. i.

4. The method of preparing guanidine hydrochloride which comprises reacting ammonia, carbon monoxide and ammonium chloride in the presence of an activated carbon catalyst which has been pre-dried to render it anhydrous, said reaction being carried out at a temperature within the range of about 250–350° C., and at a pressure within the range of about 2000–5000 p. s. i.

NAT H. MARSH.

REFERENCES CITED

The following references are of record in the file of this patent:

UNITED STATES PATENTS

| Number | Name | Date |
|---|---|---|
| 1,995,211 | Leroux | Mar. 19, 1935 |

FOREIGN PATENTS

| Number | Country | Date |
|---|---|---|
| 321,566 | Great Britain | Nov. 14, 1929 |
| 371,555 | Great Britain | Apr. 28, 1932 |

OTHER REFERENCES

Mailhe et al.: "Bull Soc. Chim."; series 4, vol. 27, p. 739 (1920).

Bredig: "Zeit Elektrochemie"; vol. 36, pp. 1007–1100 (1930).

Kortum: "Zeit Elektrochemie"; vol. 36, pp. 1008, 1009, 1012 (1930).

Bredig: "Zeit Elektrochemie"; vol. 37, pp. 2–11, (1931).